April 21, 1959  J. MENKE ET AL  2,882,823
IMPROVEMENTS IN PROXIMITY FUZES AND SIMILAR APPARATUS
Filed June 1, 1953  2 Sheets-Sheet 1
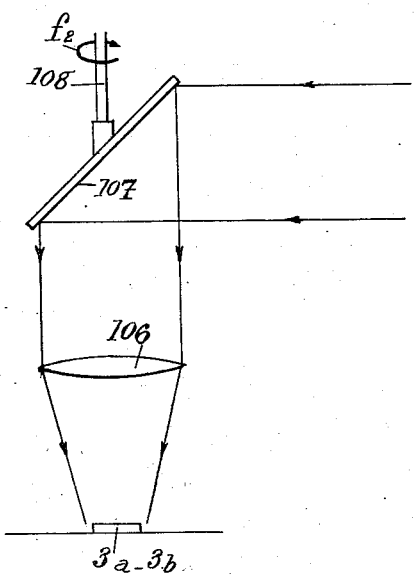
Fig. 1.
Fig. 2.
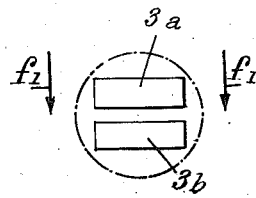
INVENTORS
JOSEPH MENKE,
ERNST DOERPINGHAUS,
BY
ATTORNEY

United States Patent Office 2,882,823
Patented Apr. 21, 1959

2,882,823

IMPROVEMENTS IN PROXIMITY FUZES AND SIMILAR APPARATUS

Joseph Menke and Ernst Doerpinghaus, Zurich, Switzerland, assignors to Society "Brinro Limited," Tangiers, a society of Tangiers Application June 1, 1953, Serial No. 358,703

Claims priority, application Luxembourg June 6, 1952

2 Claims. (Cl. 102—70.2)

The present invention relates to apparatus to be tripped or triggered into operation by a given radiation and in particular infra-red rays, such apparatus including at least one receiver capable of detecting variations (at least equal to a predetermined value which characterizes the sensitiveness of the apparatus) of an infra-red or analogous radiation, said receiver, when energized by such a variation, tripping into operation a device (for instance a signal transmitter or a charge to be ignited or a servo-motor to be started) which is to be worked in response to variations of the infra-red radiation. Our invention is more especially concerned with proximity fuzes responsive to variations of infra-red radiations.

The chief object of our invention is to provide an apparatus of this kind which is responsive both to increases and to decreases of the energizing infra-red radiation.

For this purpose, according to our invention, such an apparatus includes two devices sensitive to variations of the infra-red radiation (photo-electric or thermo-electric cells) arranged to be successively swept by partial images of the zone or field to be scanned for detection of infra-red radiation, said cells being inserted in series in a circuit including an electric source and a point of said circuit located between said two devices being connected with the control electrode of an electronic tube, for instance a thyratron, inserted in the electric circuit of the device (signal transmitter, detonator, or the like) to be operated in response to the detection of infra-red rays, so that reception of an impulse by said control electrode causes said last mentioned device to be operated.

A preferred embodiment of our invention will be hereinafter described with reference to the appended drawings, given merely by way of example, and in which:

Fig. 1 is a diagrammatical view of the optical portion of an embodiment of our invention;

Fig. 2 shows the arrangement of the photo-sensitive or thermo-sensitive cells used in the device of Fig. 1;

Figure 3:
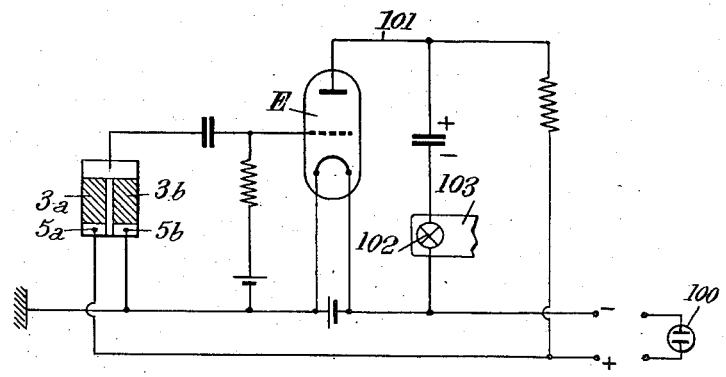
Fig. 3 shows the electric lay-out of the apparatus of Figs. 1 and 2.
Figure 4:
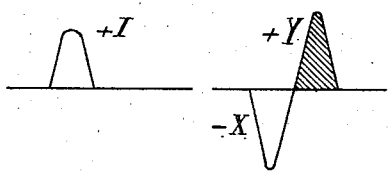
Figure 5:
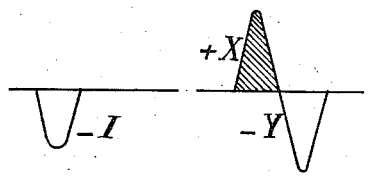

Figs. 4 and 5 diagrammatically show the control impulses obtained with an apparatus such as shown by Figs. 1 to 3.

According to our invention as illustrated, merely by way of example by the drawings, the desired operation is to be obtained both for an increase and for a decrease of the infra-red rays that are detected. In order to obtain this result, the image of the object field is scanned by two photo-sensitive or thermo-sensitive elements $3a$, $3b$ electrically connected in series and as such elements actually constitute resistances variable in response to variations of the radiation that strikes them, we obtain, between these two elements, a succession of positive and negative impulses whenever the radiations of the image portions that scan them successively undergo a modification whether it is an increasing or a decreasing one.

Fig. 1 shows the optical device. Mirror 107, when rotating about its axis 108 in the direction of arrow $f_2$, produces in the plane of photo-sensitive or thermo-sensitive cells $3a$ and $3b$ a succession of partial images of the object field which move with respect to cells $3a$ and $3b$ in the direction indicated in Fig. 8 by arrows $f_1$.

Cells $3a$ and $3b$ are identical to each other and they are combined with an electronic system such as a thyratron E, which controls the circuit 101 of the igniter 102 of a detonator 103 of a proximity fuze is shown by Fig. 3. This figure shows that the two cells are inserted in series in a circuit supplied with current from a source 100 which is connected to the terminals $5a$ and $5b$ of these cells.

The impulse which operates thyratron E is collected between the two cells $3a$ and $3b$.

It should be noted here that the action of the thyratron always takes place under the influence of a positive impulse, whereas a negative impulse is without influence thereon.

As long as the intensity of the radiation acting on the two cells $3a$ and $3b$ does not undergo substantial variations, the potential between these two cells keeps a mean value indicated in Figs. 4 and 5 by horizontal lines. For this value, the thyratron is not operated. If now, in the images successively projected onto the cells $3b$, $3a$, there occurs an increase ($+I$, Fig. 4) of the radiation, this increase, when passing successively over the two cells, produces a negative impulse $-X$, followed by a positive impulse $+Y$ (Fig. 4). It is this last mentioned positive impulse which operates the thyratron. On the other hand, if a decrease of intensity ($-I$, Fig. 5) occurs, it produces a positive impulse $+X$ followed by a negative impulse $-Y$ between the two cells $3a$, $3b$. This time, it is the positive impulse $+X$ which operates the thyratron.

The device which has just been described therefore operates as well during the night as during the day.

As a matter of fact, in the day time, an airplane by stopping the light rays produces a shadow effect (reduction of the radiation intensity, case of Fig. 5). During the night, in darkness, the approach of an airplane produces an increase of this intensity (case of Fig. 4). In both cases, the thyratron is operated. In an analogous fashion, by daytime an airplane coming near to the fuze without intercepting the sun rays produces an increase of the infra-red rays' intensity, due to the radiation emitted by its engines and therefore also causes the thyratron to be operated, whereas during the night an airplane stops the light beam from projectors from such light to produce a reduction of the intensity and consequently also causes the thyratron to be operated.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A radiation controlled apparatus for response to radiation variations inside a given field of space which comprises, in combination, an electric circuit, an electric device in said circuit, means in said circuit including an electronic tube having a control electrode capable of operating said device in response to an impulse transmitted to said control electrode, two means including each a radiation sensitive surface of a resistance variable in response to variation of the intensity of a radiation striking said surface, a circuit including a source of electrical energy and said two means inserted in series, a point of said last mentioned circuit located between said two means being connected with said control electrode, an optical system for forming an image of a portion of said field of space on said radiation sensitive surfaces, the area of each of said radiation sensitive surfaces being smaller than the area of the image of said field given by such an optical system, and means for cyclically moving at least a part of said optical system to project successively onto said two surfaces images of juxtaposed portions of said field, the sum of these portions corresponding to the whole of said field.

2. A radiation controlled apparatus for response to radiation variations inside a given field of space which comprises, in combination, an electric circuit, an electric device in said circuit, means in said circuit, including an electronic tube having a control electrode capable of operating said device in response to an impulse transmitted to said control electrode, two means including each a radiation sensitive surface of a resistance variable in response to variation of the intensity of a radiation striking said surface, a circuit including a source of electrical energy and said two means inserted in series, a point of said last mentioned circuit located between said two means being connected with said control electrode, an optical system for forming an image of a portion of said field of space on said radiation sensitive surfaces, the area of each of each of said radiation sensitive surfaces being smaller than the area of the image of said field given by such an optical system, and means for moving at least a part of said optical system to project successively onto said two surfaces images of juxtaposed portions of said field, the sun of these portions corresponding to the whole of said field.

References Cited in the file of this patent

UNITED STATES PATENTS

| | | |
|---|---|---|
| 2,421,085 | Rylsky | May 27, 1947 |
| 2,439,294 | Hammond | Apr. 6, 1948 |
| 2,468,120 | Senn | Apr. 26, 1949 |

FOREIGN PATENTS

| | | |
|---|---|---|
| 352,035 | Great Britain | June 22, 1931 |
| 839,407 | France | Jan. 4, 1939 |
| 585,792 | Great Britain | Feb. 25, 1947 |